(12) United States Patent
Bale

(10) Patent No.: US 7,633,068 B2
(45) Date of Patent: Dec. 15, 2009

(54) COUNT UNIFORMITY CORRECTION IN FLUX SPACE FOR PIXILATED SEMICONDUCTING RADIATION DETECTORS

(75) Inventor: Derek S. Bale, Gibsonia, PA (US)

(73) Assignee: Endicott Interconnect Technologies, Inc., Endicott, NY (US)

( * ) Notice: Subject to any disclaimer, the term of this patent is extended or adjusted under 35 U.S.C. 154(b) by 0 days.

(21) Appl. No.: 12/281,686

(22) PCT Filed: Mar. 13, 2007

(86) PCT No.: PCT/US2007/006351

§ 371 (c)(1),
(2), (4) Date: Sep. 4, 2008

(87) PCT Pub. No.: WO2007/109029

PCT Pub. Date: Sep. 27, 2007

(65) Prior Publication Data

US 2009/0014660 A1 Jan. 15, 2009

Related U.S. Application Data

(60) Provisional application No. 60/782,464, filed on Mar. 15, 2006.

(51) Int. Cl.
*G01T 1/24* (2006.01)
(52) U.S. Cl. .................................. 250/370.09
(58) Field of Classification Search ............ 250/370.01, 250/370.09
See application file for complete search history.

(56) References Cited

U.S. PATENT DOCUMENTS

| | | |
|---|---|---|
| 5,943,388 A | 8/1999 | Tumer |
| 6,895,071 B2 | 5/2005 | Yokhin et al. |
| 2003/0072409 A1 | 4/2003 | Kaufhold et al. |
| 2003/0173522 A1 | 9/2003 | Spartiotis |
| 2006/0019236 A1 | 1/2006 | Duncan et al. |

OTHER PUBLICATIONS

Manolis I.A. Lourakis, "A Brief Description of the Levenberg-Marquardt Algorithm Implemened by levmar," Feb. 11, 2005, Institute of Computer Science Foundation for Research and Technology-Hellas (FORTH), Crete, Greece.

*Primary Examiner*—David P Porta
*Assistant Examiner*—Marcus H Taningco
(74) *Attorney, Agent, or Firm*—Hinman, Howard & Kattell; Mark Levy

(57) ABSTRACT

In operation of a photon counting detecting system (10), a number of pulse counts output by least one pixel (20) of a photon counting detector in response to experiencing a photon flux density during a sample interval is acquired and a photon flux density (46) or value related thereto corresponding to the pulse counts output by the pixel (20) is determined. A correction (48) for the thus determined photon flux density (46) or value related thereto is determined. A corrected number of pulse counts (52) is determined for the pixel (20) as a function of the thus determined corrected photon flux density value or value related thereto. An image can be displayed that is a function of the corrected number of pulse counts for pixels of the system.

23 Claims, 3 Drawing Sheets

COUNT UNIFORMITY CORRECTION IN FLUX SPACE FOR PIXILATED SEMICONDUCTING RADIATION DETECTORS

BACKGROUND OF THE INVENTION

1. Field of the Invention

The present invention relates to photon detection systems and, more particularly, to correcting the pulse counts output by multi-pixel photon counting detectors of such systems.

2. Description of Related Art

Applications that utilize gamma or x-ray cameras, gages or imaging systems based on pixilated semiconducting radiation detectors require the use of measured counts per pixel in a given period of time to accurately discern the incident photon flux density. Most imaging applications rely on a collective uniform response of the pixels of the system when subjected to a uniform incident photon flux density. However, the material upon which such systems are based has crystal defect densities that are spatially non-uniform, thereby producing a non-uniform pixel response (sensitivity). At high flux densities, the non-uniform pixel response due to material sensitivity is made worse by a non-linear loss in measured counts due to the response of readout electronics.

For example, a typical response of a 64 pixel CdZnTe detector subjected to increasing flux density is shown in the accompanying FIG. 4. Non-uniform pixel sensitivity coupled with the effect of the readout electronics can be seen by an increasing spread of the high and low counting pixels for a given flux density, typically expressed in terms of x-ray tube current.

If the dependence of photon flux density (expressed in terms of x-ray tube current) in FIG. 4 to a number of counts output by each pixel were linear, it would be trivial to correct the counts across the desired photon flux density. Namely, simply elevate (or suppress) a pixel's counts to some averaged level using a constant multiplier. FIG. 4, however, demonstrates that for higher fluxes this dependence is, in fact, quite nonlinear. A single-point sensitivity correction then becomes dependent on the flux density at which the correction is being done. One solution is to break the desired flux density range into multiple intervals, and on each sub-interval apply a single point correction. These correction schemes all operate solely on measured counts. However, these correction schemes fail away from the flux density where the correction was made.

It would, therefore, be desirable to provide a method and system for correcting the pulse counts output by pixels of a photon detection system that avoids the above problems and others. Still other problems that the present invention overcomes will become apparent to those of ordinary skill in the art upon reading and understanding the following detailed description.

SUMMARY OF THE INVENTION

The invention is a method of operating a photon counting detecting system. The method includes (a) electronically storing for each of a plurality of pixels of a photon counting detector a plot of pulse counts output by the pixel over a range of corresponding photon flux densities; (b) electronically storing a plot, determined from the plots of step (a), of an intermediate number of pulse counts output by all of the pixels over a subset of the range of photon flux densities; (c) electronically acquiring for one pixel of the photon counting detector a number of pulse counts output by the pixel in response to photons striking the pixel during a sample interval; (d) electronically determining a photon flux density corresponding to the pulse counts output by the pixel in step (c) from the corresponding plot of step (a); (e) electronically correcting the value of the photon flux density determined in step (d) as a function of parameters of a curve fitting function that approximates the plot of step (b) and as a function of other parameters of the curve fitting function that separately approximates the plot of step (a) for the pixel of step (c); and (f) electronically determining from the corrected photon flux density value a corrected number of pulse counts for the pixel.

The value of each photon flux density can be represented indirectly by the value of an electrical parameter of a means utilized to generate the photon flux. For example, each value of photon flux density can be represented by a current supplied to an x-ray tube that is utilized to generate the photon flux, there being a known relationship between said tube current and the photon flux generated by the x-ray tube in response to said tube current.

The method can further include repeating steps (c)-(f) for the plurality pixels of the photon counting detector.

As used herein, each electronically stored plot can comprise either a plurality of data sets, each of which includes a value related to the photon flux density striking the pixel during a sample interval and a corresponding pulse count output by the pixel in response thereto, or values determined for parameters of a curve fitting equation that approximates the shape of the plot. Each plot including values for parameters of a curve fitting equation can further comprise an algorithm (discussed hereinafter) for determining the photon flux density or tube current from the number of pulse counts output by the pixel during a sample time interval, or vice versa, as a function of the values determined for the parameters of the curve fitting equation for the plot.

The plot for each pixel in step (a) can be comprised of a plurality of data sets, each of which includes a value related to the photon flux density striking the pixel during the sample interval and the corresponding pulse counts output by the pixel in response thereto. The electronically determining in step (d) can include one of the following: (1) electronically extracting from the data set that includes the number of pulse counts output by the pixel in step (c) the corresponding value related to the photon flux density; (2) electronically interpolating between at least two of the data sets, wherein the pulse counts output by the pixel in step (c) is between the pulse counts comprising said at least two data sets; or (3) electronically calculating the photon flux density as a function of the number of pulse counts output by the pixel in step (c), the sample interval, and the width of the pulses output by the pixel.

The intermediate number of pulse counts in step (b) can be the average number of pulse counts output by all of the pixels over the range of flux densities.

The photon flux density or a value (tube current) related thereto can be determined as a function of the following equation:

$$\lambda^* = -\frac{1}{\tau}\ln\left(1 - \frac{C_n \tau}{b_n T}\right),$$

where $\lambda^*$=photon flux density or value related thereto; $C_n$=number of pulse counts output the by the pixel of step (c) during the sample interval; $\tau$=a time constant; $T$=sample interval; and $b_n$=a parameter of the curve fitting function that approximates the plot of step (a) for the pixel of step (c).

The parameters of the curve fitting function can be determined via the Levenberg-Marquardt algorithm.

The following equation can be used for electronically correcting the value of the photon flux density, or the value related thereto, in step (e)

$$\hat{\lambda}^* = \left(\frac{a}{a_n}\right)\lambda^*,$$

where a=a parameter of the curve fitting function that approximates the plot of step (b); $a_n$=another parameter of the curve fitting function that approximates the plot of step (a) for the pixel of step (c); and $\hat{\lambda}^*$=the corrected photon flux density or the value related thereto.

The corrected number of pulse counts in step (f) can be determined as a function of the following equation:

$$\hat{C}_n = b\left(\frac{T}{\tau}\right)[1 - e^{-\hat{\lambda}^*\tau}],$$

where $\hat{C}_n$=corrected number of pulse counts; and b=another parameter of the curve fitting function that approximates the plot of step (b).

Herein, the determination of the photon flux density, the value related thereto or the corrected number of pulse counts as a function of a suitable equation can include a mathematical expansion of said equation, e.g., a Taylor series expansion. Hence, the phrase "as a function of" is intended to mean not only the equation but any suitable and/or desirable expansion of said equation.

The invention is also a photon counting detecting system that includes a photon counting detector including a plurality of pixels and an electronic storage which electronically stores a plot for each pixel of pulse counts output by the pixel versus values related to photon flux densities striking the pixel and which electronically stores a plot of an intermediate number of pulse counts output by all of the pixels versus the values related to the photon flux densities. The system further includes means for electronically acquiring a number of pulse counts output by each pixel in response to photons striking the pixel during a sample interval and a controller programmed to determine a value related to the photon flux density corresponding to the acquired number of pulse counts output by the pixel from the plot thereof, to determine a corrected value related to the photon flux density for the pixel as a function of (a) the value related to the photon flux density determined by the controller, (b) the plot for the pixel, and (c) the plot of the intermediate number of pulse counts output by all of the pixels versus the values related to the photon flux densities, and to determine from the corrected value related to the photon flux density a corrected number of pulse counts for the pixel.

The plot for each pixel can be comprised of a plurality of data sets, each of which includes the value related to the photon flux density striking the pixel during the sample interval and the corresponding pulse counts output by the pixel in response thereto. The controller determining the value related to the photon flux density corresponding to the acquired number of pulse counts output by each pixel from the plot thereof can either: (a) directly extract the corresponding value from one of the data sets comprising the plot; (b) interpolate the corresponding value from at least two of the data sets comprising the plot; or (c) calculate the value as a function of the acquired number of pulse counts and the sample interval.

The controller can determine the value related to the photon flux density corresponding to the acquired number of pulse counts output by the pixel as a function of the following equation:

$$\lambda^* = -\frac{1}{\tau}\ln\left(1 - \frac{C_n\tau}{b_nT}\right),$$

where $\lambda^*$=value related to the photon flux density; $C_n$=number of pulse counts output by the pixel during the sample interval; $\tau$=a time constant ; T=sample interval; and $b_n$=a parameter of a curve fitting function that approximates the plot for the pixel.

The parameters of the curve fitting function can be determined via the Levenberg-Marquardt algorithm.

The controller can utilize the following equation to determine the value related to the corrected photon flux density $$\hat{\lambda}^* = \left(\frac{a}{a_n}\right)\lambda^*,$$

where a=a parameter of the curve fitting function that approximates the plot of the intermediate number of pulse counts output by all of the pixels versus the photon flux densities; $a_n$=another parameter of the curve fitting function that approximates the plot for the pixel; and $\hat{\lambda}^*$=the value related to the corrected photon flux density.

The controller can determine the corrected number of pulse counts as a function of the following equation:

$$\hat{C}_n = b\left(\frac{T}{\tau}\right)[1 - e^{-\hat{\lambda}^*\tau}],$$

where $\hat{C}_n$=corrected number of pulse counts; b=another parameter of the curve fitting function that approximates the plot of the intermediate number of pulse counts output by all of the pixels versus the photon flux densities.

The system can further include a display for displaying an image corresponding to the corrected number of pulse counts determined for the pixels of the photon counting detector.

Lastly, the invention is a photon counting detecting system operating method that includes (a) acquiring for at least one pixel of a photon counting detector a number of pulse counts output by the pixel in response to experiencing a photon flux density during a sample interval; (b) determining a value of the photon flux density or a value related to the photon flux density corresponding to the pulse counts output by the pixel; (c) determining a correction for the value of photon flux density or the value related to the photon flux density determined in step (b) as a function of an approximation of the response of the pixel to a range of flux densities or values related thereto and an approximation of an average response of all the pixels to the range of flux densities or values related thereto; and (d) determining a corrected number of pulse counts for the pixel as a function of the corrected photon flux density value or the corrected value related to the photon flux density.

The method can further include (e) repeating steps (a)-(d) for each pixel of a subset of the pixels of the photon counting detector; (f) accumulating the corrected number of pulse counts for the subset of the pixels; and (g) displaying an image that is a function of the accumulated corrected number of pulse counts for the subset of the pixels.

DETAILED DESCRIPTION OF THE INVENTION

The present invention will be described with reference to the accompanying figures where like reference numbers correspond to like elements.

Figure 1:
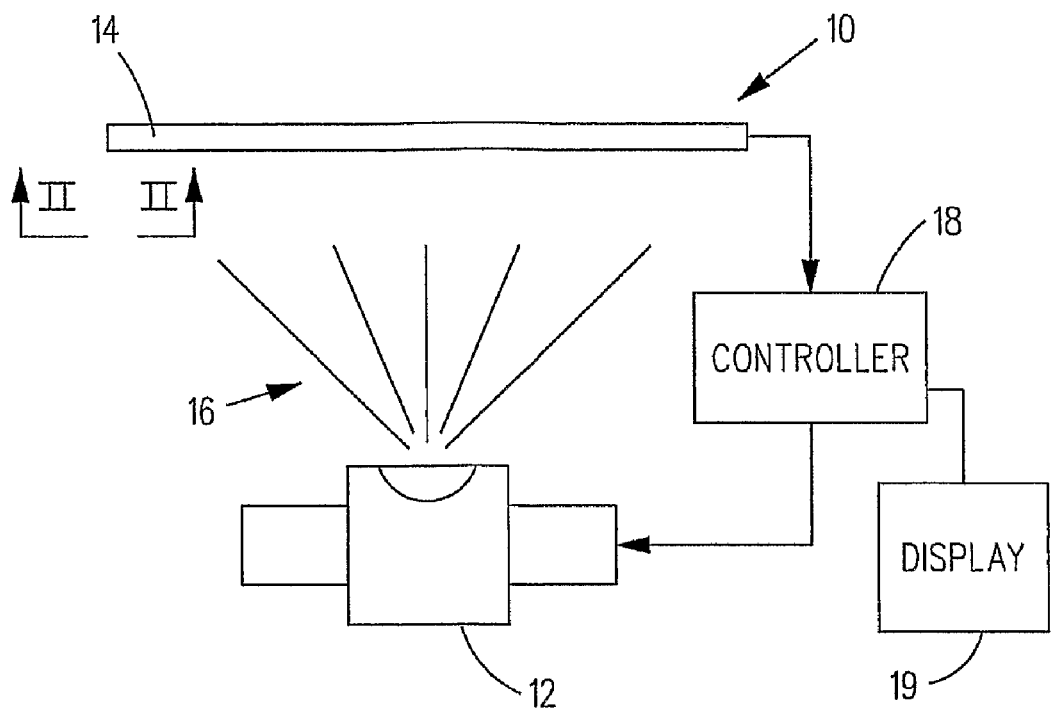
FIG. 1 is a schematic drawing of an exemplary photon detection system.

With reference to FIG. 1, a radiographic imaging system 10 includes a high energy photon source 12, such as, without limitation, an x-ray source or a gamma ray source, and at least one detector array 14 positioned in a transmission path 16 of photons output by photon source 12. If desired, a collimator (not shown) may be positioned between photon source 12 and detector array 14 for shaping, focusing and restricting the photons that impinge on detector array 14.

One or more controllers 18 can be provided and operative for controlling the operation of photon source 12 and for detecting and processing photon events detected by the radiation detection elements or pixels (described hereinafter) of detector array 14. The depiction in FIG. 1 of a single controller 18 coupled to photon source 12 and detector array 14 is not to be construed as limiting the invention since it is envisioned that any number of controllers 18, operating independently or in coordination with each other, can be utilized.

Signal processing electronics (not specifically shown) can be provided as standalone components, as an integral part of detector array 14, as an integral part of controller 18, or some combination thereof, as desired. In response to each photon from photon source 12 striking one of the pixels of detector array 14, a charge is generated thereby that is proportional to the energy of the photon. The charge generated in each pixel is output thereby as a current or voltage pulse which is processed by the signal processing electronics. For each pixel, the signal processing electronics determines whether the energy of the photon exceeds a threshold value and for all of the pixels accumulates the number of photon events occurring within a sample interval of time into a window or frame that can be processed, along with other windows or frames, by controller 18 into an image of the photons striking detector array 14 during said sample interval. Inasmuch as suitable signal processing electronics are well-known in the art, they will not be described herein for purpose of simplicity.

Figure 2:
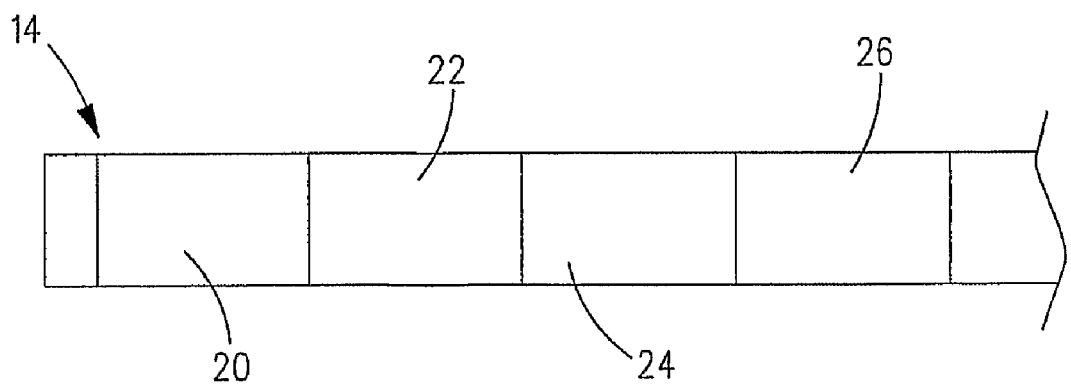
FIG. 2 is a view taken along lines II-II in FIG. 1.

With reference to FIG. 2 and with continuing reference to FIG. 1, an enlarged view of four pixels 20-26 of detector array 14 is shown. The illustration of detector array 14 as being a linear detector array comprised of a single row or column of a number of pixels is not to be construed as limiting the invention since it is envisioned that detector array 14 can include any suitable and/or desirable number of rows and/or columns deemed suitable and/or desirable by one of ordinary skill in the art. Accordingly, the description herein of the present invention in connection with the linear detector array 14 shown in FIGS. 1 and 2 is not to be construed as limiting the invention.

Figure 3:
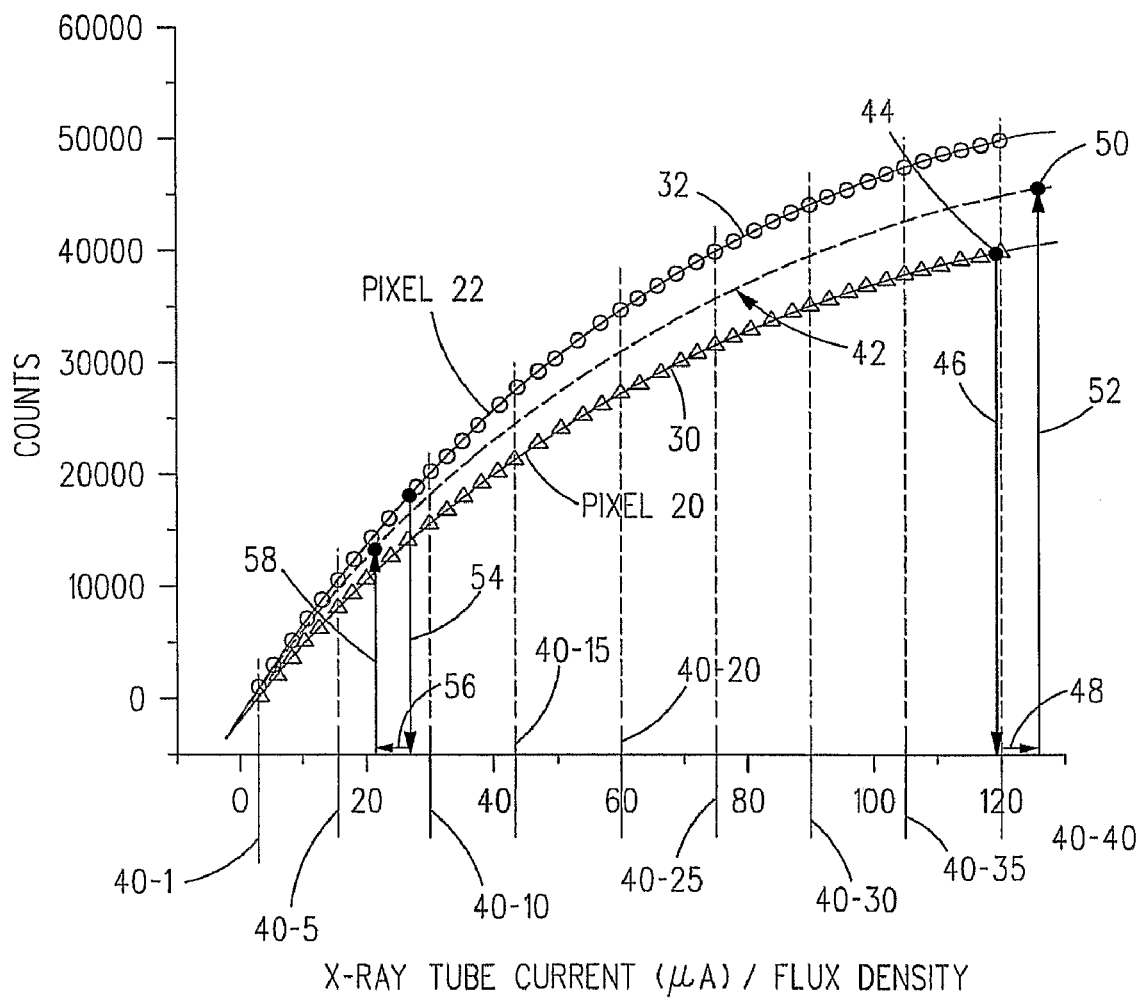
FIG. 3 shows plots of x-ray tube current/flux density versus the number of pulse counts output by two of the pixels shown in FIG. 2 and the intermediate or average number of pulse counts output by said pixels.
Figure 4:
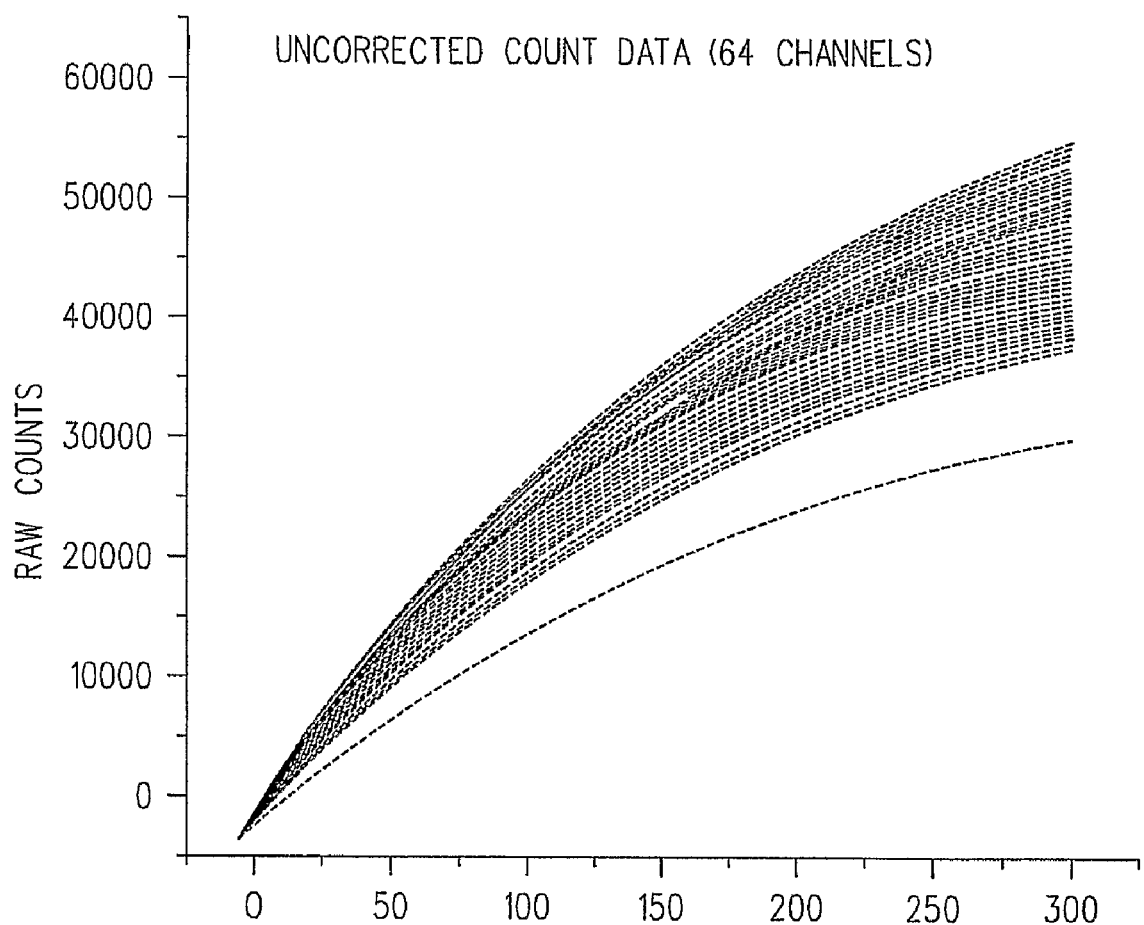
FIG. 4 is an exemplary plot of x-ray tube current/flux density versus the uncorrected number of counts output by the pixels of a photon detection system in accordance with the prior art.

With reference to FIG. 3 and with continuing reference to FIGS. 1 and 2, plots 30 and 32 of the response of pixels 20 and 22, respectively, are shown. Each plot 30 and 32 shows, for a sample interval of time, the number of pulse counts output by the corresponding pixel in response to being exposed to a range photon flux densities corresponding to the indicated range of current supplied to photon source 12 in the form of an x-ray tube. For the purpose of describing the present invention, hereinafter, it will be assumed that photon source 12 is an x-ray tube. However, this is not to be construed as limiting the invention.

For the purpose of simplicity, the present invention will be described in connection with the response of pixels 20 and 22. However, this is not to be construed as limiting the invention since the present invention is extensible to a detector array 14 having any number of pixels and/or arrangements thereof.

As can be seen in FIG. 3, each pixel 20 and 22 can have a unique, non-uniform response to the same range of photon flux densities. In order to produce the best possible images, it is necessary that the response of each pixel 20 and 22, represented by plots 30 and 32, respectively, be corrected, as necessary, to account for such non-uniformity. To this end, a least squares curve fitting algorithm, desirably the Levenberg-Marquardt curve fitting algorithm, is utilized to determine or approximate a best fit curve for the points of each plot 30 and 32 in a manner known in the art.

Application of the Levenberg-Marquardt curve fitting algorithm to each plot 30 and 32 generates curve fitting parameters $a_n$ and $b_n$ therefor. For example, utilizing the Levenberg-Marquardt curve fitting algorithm, values of $a_{20}=7220$ and $b_{20}=1.57$ can be determined for plot 30 pixel 20) and values of $a_{22}=9618$ and $b_{22}=1.64$ can be determined for plot 32 (pixel 22).

The x-ray tube current/flux density that corresponds to the number of counts output by each pixel 20, 22 during a sample interval can be (i) determined empirically from physical instantiations of the corresponding plot 30, 32, (ii) extracted directly from the data sets used to generate the corresponding plot 30, 32, (iii) interpolated from the data sets used to generate the corresponding plot 30, 32, or (iv) determined quantitatively or mathematically utilizing the following equation EQ1, which defines a relationship between the x-ray tube current/flux density and the number of counts output by the corresponding pixel.

$$C_n = b_n \left(\frac{T}{\tau}\right)[1 - e^{-a_n I \tau}], \text{ where} \qquad \text{EQ 1}$$

$a_n$ and $b_n$=curve fitting parameters determined via a curve fitting function for pixel n;
I=x-ray tube current/flux density;
T=sample interval;
$\tau$=a time constant used for the purpose of solving EQ1; and
$C_n$=number of pulses output by pixel n during a sample interval of time in response to x-ray tube current I.

In EQ1, $\tau$ can be any suitable and/or desirable time value that facilitates the solution of EQ1 and yields desirable values for $a_n$ and $b_n$. In one nonlimiting example described hereinafter, $\tau$=1.2 μs. However, this is not to be construed as limiting the invention.

From the values of $a_n$ and $b_n$ determined for each plot 30 and 32, an average or intermediate number of counts output by all of the pixels 20 and 22 at each of a number of points, e.g., points 40, along the x-ray tube current/flux density axis of FIG. 3 can be determined utilizing the following equations EQ2, EQ3 and EQ4.

$$\underline{C} = \underline{b}\left(\frac{T}{\tau}\right)[1 - e^{-aI\tau}], \text{ where} \qquad \text{EQ 2}$$

a and b=average values of curve fitting parameters $a_n$ and $b_n$ for all of the pixels n at the corresponding x-ray tube current/flux density;

I=x-ray tube current/flux density at each point along the x-ray tube current/flux density axis; and C=average or intermediate number of counts output by all of the pixels over the sample interval for a given x-ray tube current/flux density I.

Utilizing the above values for $a_{20}$ and $a_{22}$, the value of a in equation EQ2 can be determined utilizing the following equation EQ3.

$$\underline{a} = \frac{1}{2}(a_{20} + a_{22}) = 8419 \qquad \text{EQ 3}$$

Similarly, utilizing the above values for $b_{20}$ and $b_{22}$, the value of b in equation EQ2 can be determined utilizing the following equation EQ4.

$$\underline{b} = \frac{1}{2}(b_{20} + b_{22}) = 1.61 \qquad \text{EQ 4}$$

In equations EQ3 and EQ4, the constant ½ is utilized since only two pixels are being considered and the value in the denominator of this constant represents the number of pixels under consideration. Thus, for example, if four pixels were under consideration, the constant ½ would be replaced by the constant ¼.

As can be seen, the solution of equation EQ2 for each of the number of points along the x-ray tube current/flux density axis of FIG. 3 yields for the value of x-ray tube current/flux density I at said point a corresponding average or intermediate number of counts C output by all of the pixels over the sample interval, i.e., a data set (C, I) A plot 42 joining all of the thus determined data sets (C, I) at the number of points, e.g., points 40, along the x-ray tube current/flux density axis in FIG. 3 is shown by the dashed line in FIG. 3.

Once values have been determined for parameters $a_n$ and $b_n$ for each plot 30 and 32, and values have been determined for parameters a and b for plot 42, a method for carrying out a correction for an incoming number of counts in accordance with the present invention can be performed. The correction method in accordance with the present invention will now be described with reference to the following example. However, the following example is not to be construed as limiting the invention.

Suppose a count value or number of counts $C_n$=42,194 is obtained from pixel 20 for a flux density corresponding to an x-ray tube current of 120 μA. To correct the flux density corresponding to this count value in accordance with the present invention, the apparent x-ray tube current/flux density corresponding to the count value is determined utilizing the following equation EQ5.

$$\lambda^* = -\frac{1}{\tau}\ln\left(1 - \frac{C_n \tau}{b_n T}\right), \text{ where} \qquad \text{EQ 5}$$

$\lambda^*$=apparent tube current/photon flux density.

In FIG. 3, the count value of 42,194 for pixel 20 is shown by reference number 44. The calculation of the apparent tube current/flux density $\lambda^*$ utilizing equation EQ5 is shown diagrammatically in FIG. 3 by the projection of this count value to the x-ray tube current/flux density axis as shown by arrow 46.

Where $C_n$=42,194, $b_n$=1.57, T=50 ms and τ=1.2 μs, it can be determined from equation EQ5 that $\lambda^*$=863,040.

Next, the corrected tube current/photon flux density is determined utilizing the following equation EQ6.

$$\hat{\lambda}^* = \left(\frac{a}{a_n}\right)\lambda^*, \text{ where} \qquad \text{EQ 6}$$

$\hat{\lambda}^*$=the corrected tube current/photon flux density.

Utilizing the above-determined values for a (determined in equation EQ3), $\hat{\lambda}^*$(determined in equation EQ5) and $a_n$ (determined from the curve fitting algorithm for plot 30 of the response of pixel 20), it can be determined from equation EQ6 that $\hat{\lambda}^*$=1,006,362. The increase in tube current/photon flux density from $\lambda^*$ to $\hat{\lambda}^*$ is shown diagrammatically in FIG. 3 by arrow 48.

Lastly, the corrected count value or corrected number of pulse counts is determined utilizing the following equation EQ7.

$$\hat{C}_n = \underline{b}\left(\frac{T}{\tau}\right)[1 - e^{-\hat{\lambda}^* \tau}], \text{ where} \qquad \text{EQ 7}$$

$\hat{C}_n$=corrected number of pulse count.

Utilizing the above-determined values for b (determined in equation EQ4) and $\hat{\lambda}^*$(determined in equation EQ6) in equation EQ7, it can be determined that the value of $\hat{C}_n$=47,032, which corresponds to a point 50 on plot 42. In FIG. 3, the projection of corrected tube current/photon flux density $\hat{\lambda}^*$ to the corrected number of pulses counts $\hat{C}_n$ is shown by arrow 52.

Thus, as can be seen, once values of $a_n$ and $b_n$ have been determined for each plot 30 and 32 and values of a and b have been determined for plot 42, a corrected number of pulse counts for each pixel can be determined from the incoming number of pulse counts utilizing equations EQ5, EQ6 and EQ7 in the above-described manner, wherein the same value for T and τ are used in each of equations EQ5, EQ6 and EQ7.

The above-described example for plot 30 of pixel 20 having count values below the intermediate or average count values of plot 42 is also applicable to plot 32 of pixel 22 having count values above the intermediate or average count values of plot 42. This is because the ratio of $\dfrac{a}{a_n}$, where $n = 22$(pixel 22), in equation EQ6 will have a value less than 1. Thus, in a manner similar to that described above, an incoming number of counts for pixel 22 having a corresponding point on plot 32 can be converted to a corrected number of pulse counts on plot 42, the difference in this case being that instead of having an increasing flux density as shown by arrow 52 for the previous example, the corrected photon flux density will be less. Thus, instead of equations EQ5, EQ6 and EQ7 corresponding to the path shown diagrammatically by arrows 46, 48 and 52 for pixel 20 in FIG. 3, equations EQ5, EQ6 and EQ7 will correspond to the path shown diagrammatically, for example and without limitation, by arrows 54, 56 and 58, respectively, for pixel 22 in FIG. 3.

Also or alternatively, instead of utilizing equation EQ5, controller 18 can determine the tube current/photon flux density corresponding to the acquired number of pulse counts output by each pixel from the plot thereof either by directly extracting the corresponding tube current/photon flux density from one of the data sets comprising the plot or by interpolating the corresponding tube current/photon flux density from at least two of the data sets comprising the plot.

Thus, as can be seen, the present invention provides a method that naturally compensates for the nonlinearity in the dependence of measured counts on flux density that corrects the tube current/flux density itself, not the measured counts per se. This correction is based on the understanding that material sensitivity is independent of flux density (tube current) over a large enough range of flux density (tube current). Accordingly, the present invention inherently takes into consideration the non-linear dependence of the measured counts on flux density (tube current).

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A photon counting detecting system operating method comprising:
   (a) electronically storing for each of a plurality of pixels of a photon counting detector a plot of pulse counts output by the pixel over a range of corresponding photon flux densities;
   (b) electronically storing a plot, determined from the plots of step (a), of an intermediate number of pulse counts output by all of the pixels over the range of photon flux densities;
   (c) electronically acquiring for one pixel of the photon counting detector a number of pulse counts output by the pixel in response to photons striking the pixel during a sample interval;
   (d) electronically determining a photon flux density corresponding to the pulse counts output by the pixel in step (c) from the corresponding plot of step (a);
   (e) electronically correcting the value of the photon flux density determined in step (d) as a function of parameters of a curve fitting function that approximates the plot of step (b) and as a function of other parameters of the curve fitting function that separately approximates the plot of step (a) for the pixel of step (c); and
   (f) electronically determining from the corrected photon flux density value a corrected number of pulse counts for the pixel.

2. The method of claim 1, further including repeating steps (c)-(f) for each pixel of the photon counting detector.

3. The method of claim 1, wherein the value of each photon flux density is represented by the value of an electrical parameter of a means for generating the photon flux density.

4. The method of claim 1, wherein:
   the plot for each pixel in step (a) is comprised of a plurality of data sets, each of which includes a value related to the photon flux density striking the pixel during the sample interval and the corresponding pulse counts output by the pixel in response thereto; and
   the electronically determining in step (d) includes extracting from the data set that includes the number of pulse counts output by the pixel in step (c) the corresponding value related to the photon flux density.

5. The method of claim 1, wherein:
   the plot for each pixel in step (a) is comprised of a plurality of data sets, each of which includes a value related to the photon flux density striking the pixel during the sample interval and the corresponding pulse counts output by the pixel in response thereto; and
   the electronically determining in step (d) includes electronically interpolating between at least two of the data sets, wherein the pulse counts output by the pixel in step (c) is between the pulse counts comprising said at least two data sets.

6. The method of claim 1, wherein the intermediate number of pulse counts in step (b) is the average number of pulse counts output by all of the pixels over the range of flux densities.

7. The method of claim 1, wherein each plot is comprised of either:
   a plurality of data sets, each of which includes a value related to the photon flux density striking the pixel during a sample interval and a corresponding pulse counts output by the pixel in response thereto; or
   values determined for parameters of a curve fitting equation that approximates the shape of the plot.

8. The method of claim 1, wherein each plot including the values for the parameters of the curve fitting equation further comprises an algorithm for determining the photon flux density or tube current from the number of counts output by the pixel during a sample time interval, or vice versa, as a function of the values determined for the parameters of the curve fitting equation for the plot.

9. The method of claim 1, wherein electronically determining in step (d) includes:
   electronically calculating the photon flux density as a function of the number of pulse counts output by the pixel in step (c) and the sample interval.

10. The method of claim 9, wherein the photon flux density or a value related thereto in step (d) is electronically determined as a function of the following equation:

$$\lambda^* = -\dfrac{1}{\tau}\ln\left(1 - \dfrac{C_n \tau}{b_n T}\right), \text{ where}$$

$\lambda^*$=photon flux density or value related thereto;
$C_n$=number of pulse counts output by the pixel of step (c) during the sample interval;
$\tau$=a time constant;
T=sample interval; and $b_n$=a parameter of the curve fitting function that approximates the plot of step (a) for the pixel of step (c).

11. The method of claim 10, wherein the parameters of the curve fitting function are determined via the Levenberg-Marquardt algorithm.

12. The method of claim 10, wherein the following equation is used for electronically correcting the value of the photon flux density or value related thereto in step (e)

$$\hat{\lambda}^* = \left(\frac{a}{a_n}\right)\lambda^*, \text{ where}$$

a=a parameter of the curve fitting function that approximates the plot of step (b);
$a_n$=another parameter of the curve fitting function that approximates the plot of step (a) for the pixel of step (c); and
$\hat{\lambda}^*$=the corrected photon flux density or the value related thereto.

13. The method of claim 12, wherein the corrected number of pulse counts in step (f) is electronically determined as a function of the following equation:

$$\hat{C}_n = b\left(\frac{T}{\tau}\right)[1 - e^{-\hat{\lambda}^*\tau}], \text{ where}$$

$\hat{C}_n$=corrected number of pulse counts; and
b=another parameter of the curve fitting function that approximates the plot of step (b).

14. A photon counting detecting system comprising:
a photon counting detector including a plurality of pixels;
an electronic storage which:
  stores a plot for each pixel of pulse counts output by the pixel versus values related to photon flux densities striking the pixel; and
  stores a plot of an intermediate number of pulse counts output by all of the pixels versus values related to the photon flux densities;
means for electronically acquiring a number of pulse counts output by each pixel in response to photons striking the pixel during a sample interval; and
a controller programmed to:
  determine a value related to a photon flux density corresponding to the acquired number of pulse counts output by the pixel from the plot thereof,
  determine a corrected value related to the photon flux density for the pixel as a function of (a) the value related to the photon flux density determined by the controller, (b) the plot for the pixel, and (c) the plot of the intermediate number of pulse counts output by all of the pixels versus the values related to the photon flux densities, and
  determine from the corrected value related to the photon flux density a corrected number of pulse counts for the pixel.

15. The system of claim 14, wherein:
the plot for each pixel is comprised of a plurality of data sets, each of which includes the value related to the photon flux density striking the pixel during the sample interval and the corresponding pulse counts output by the pixel in response thereto; and
the controller determining the value related to the photon flux density corresponding to the acquired number of pulse counts output by each pixel from the plot thereof either: (a) directly extracts the corresponding value from one of the data sets comprising the plot, or (b) interpolates the corresponding value from at least two of the data sets comprising the plot.

16. The system of claim 14, wherein the controller determines the value related to the photon flux density as a function of (a) the acquired number of pulse counts and (b) the sample interval.

17. The system of claim 16, wherein the controller determines the value related to the photon flux density corresponding to the acquired number of pulse counts output by the pixel as a function of the following equation:

$$\lambda^* = -\frac{1}{\tau}\ln\left(1 - \frac{C_n\tau}{b_n T}\right), \text{ where}$$

$\lambda^*$=value related to the photon flux density;
$C_n$=number of pulse counts output by the pixel during the sample interval;
$\tau$=a time constant;
T=sample interval; and
$b_n$=a parameter of a curve fitting function that approximates the plot for the pixel.

18. The system of claim 17, wherein the parameters of the curve fitting function are determined via the Levenberg-Marquardt algorithm.

19. The system of claim 17, wherein the controller determines the value related to the corrected photon flux density as a function of the following equation:

$$\hat{\lambda}^* = \left(\frac{a}{a_n}\right)\lambda^*, \text{ where}$$

a=a parameter of the curve fitting function that approximates the plot of the intermediate number of pulse counts output by all of the pixels versus the photon flux densities;
$a_n$=another parameter of the curve fitting function that approximates the plot for the pixel; and
$\hat{\lambda}^*$=the value related to the corrected photon flux density.

20. The system of claim 19, wherein the controller utilizes the following equation to determine the corrected number of pulse counts $$\hat{C}_n = b\left(\frac{T}{\tau}\right)[1 - e^{-\hat{\lambda}^*\tau}], \text{ where}$$

$\hat{C}_n$=corrected number of pulse counts; and
b=another parameter of the curve fitting function that approximates the plot of the intermediate number of pulse counts output by all of the pixels versus the photon flux densities.

21. The system of claim 14, further including a display for displaying an image corresponding to the corrected number of pulse counts determined for the pixels of the photon counting detector.

22. A photon counting detecting system operating method comprising:
(a) acquiring for at least one pixel of a photon counting detector a number of pulse counts output by the pixel in response to experiencing photon flux during a sample interval;

(b) determining a value related to the photon flux density or a value related thereto corresponding to the pulse counts output by the pixel;
(c) determining a correction for the value of photon flux density or a value related thereto determined in step (b) as a function of an approximation of the response of the pixel to a range of flux densities or values related thereto and an approximation of an average response of all the pixels to the range of flux densities or values related thereto; and
(d) determining a corrected number of pulse counts for the pixel as a function of the corrected photon flux density value determined in step (c) or the corrected value related thereto.

23. The method of claim 22, further including:
(e) repeating steps (a)-(d) for each pixel of a subset of the pixels of the photon counting detector;
(f) accumulating the corrected number of pulse counts for the subset of the pixels; and
(g) displaying an image that is a function of the accumulated corrected number of pulse counts for the subset of the pixels.

* * * * *